(12) United States Patent  
Parry et al.

(10) Patent No.: US 8,667,772 B2
(45) Date of Patent: Mar. 11, 2014

(54) CLUTCHED TURBINE WHEELS

(75) Inventors: William Thomas Parry, Rexford, NY (US); Nestor Hernandez Sanchez, Schenectady, NY (US); Michael Alan Davi, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 1101 days.

(21) Appl. No.: 12/651,744

(22) Filed: Jan. 4, 2010

(65) Prior Publication Data
US 2011/0162341 A1 Jul. 7, 2011

(51) Int. Cl.
*F16H 61/60* (2006.01)
*F01K 23/10* (2006.01)
*F02C 7/36* (2006.01)

(52) U.S. Cl.
USPC .......... 60/39.182; 60/341; 60/791; 416/169 R

(58) Field of Classification Search
USPC .............. 60/341, 345, 346, 435, 507, 39.182, 60/791; 415/61; 416/169 R
See application file for complete search history.

(56) References Cited

U.S. PATENT DOCUMENTS

| | | | | | |
|---|---|---|---|---|---|
| 2,212,901 | A | * | 8/1940 | Schneider | 60/341 |
| 3,008,296 | A | * | 11/1961 | Milligan | 415/18 |
| 3,154,181 | A | * | 10/1964 | Hans | 192/69.3 |
| 3,350,060 | A | * | 10/1967 | La Fleur et al. | 415/123 |
| 3,481,145 | A | * | 12/1969 | Oldfield | 60/788 |
| 3,483,696 | A | * | 12/1969 | Gilbert et al. | 60/792 |
| 4,753,077 | A | | 6/1988 | Rosenblatt | |
| 5,174,109 | A | | 12/1992 | Lampe | |
| 6,463,729 | B2 | * | 10/2002 | Magoshi et al. | 60/39.182 |
| 6,732,844 | B2 | * | 5/2004 | Muramatsu | 192/46 |

FOREIGN PATENT DOCUMENTS

JP 9041906 10/1997

* cited by examiner

*Primary Examiner* — William H Rodriguez
*Assistant Examiner* — Carlos A Rivera
(74) *Attorney, Agent, or Firm* — Hoffman Warnick LLC; Ernest G. Cusick

(57) ABSTRACT

Solutions for clutching turbine wheels are disclosed. In one embodiment, an apparatus includes: a turbine rotor shaft; a plurality of turbine wheels affixed to the turbine rotor shaft; an independent turbine wheel engagably attached to the turbine rotor shaft; and a clutch operably connected to the turbine rotor shaft, the clutch configured to couple and decouple the independent turbine wheel from the turbine rotor shaft.

15 Claims, 8 Drawing Sheets

CLUTCHED TURBINE WHEELS

BACKGROUND OF THE INVENTION

The subject matter disclosed herein relates to clutched turbine wheels. Specifically, the subject matter disclosed herein relates to solutions for clutching turbine wheels to improve turbine performance.

Turbine machines, for example, steam turbines and gas turbines, include a plurality of wheels (or stages) at different locations along a main rotor shaft. These wheels each include a plurality of turbine blades, which during operation, drive rotation of the main rotor shaft via mechanical forces caused by the flow and expansion of a working fluid across the turbine blades. During startup of these turbine machines, or in times of lower load, reduced pressure in the machine may cause one or more of the turbine wheels to function inefficiently.

BRIEF DESCRIPTION OF THE INVENTION

Solutions for clutching turbine wheels are disclosed. In one embodiment, an apparatus includes: a turbine rotor shaft; a plurality of turbine wheels affixed to the turbine rotor shaft; an independent turbine wheel engagably attached to the turbine rotor shaft; and a clutch operably connected to the turbine rotor shaft, the clutch configured to couple and decouple the independent turbine wheel from the turbine rotor shaft.

A first aspect of the invention provides an apparatus comprising: a turbine rotor shaft; a plurality of turbine wheels affixed to the turbine rotor shaft; an independent turbine wheel engagably attached to the turbine rotor shaft; and a clutch operably connected to the turbine rotor shaft, the clutch configured to couple and decouple the independent turbine wheel from the turbine rotor shaft.

A second aspect of the invention provides an apparatus comprising: a load device; and a turbine coupled to the load device, the turbine including: a turbine rotor shaft; a plurality of turbine wheels affixed to the turbine rotor shaft; an independent turbine wheel engagably attached to the turbine rotor shaft; and a clutch operably connected to the turbine rotor shaft, the clutch configured to couple and decouple the independent turbine wheel from the turbine rotor shaft.

A third aspect of the invention provides a system comprising: a gas turbine operably connected to a first load device; a heat exchanger operably connected to the gas turbine; and a steam turbine operably connected to the heat exchanger; wherein at least one of the gas turbine or the steam turbine include: a turbine rotor shaft; a plurality of turbine wheels affixed to the turbine rotor shaft; an independent turbine wheel engagably attached to the turbine rotor shaft; and a clutch operably connected to the turbine rotor shaft, the clutch configured to couple and decouple the independent turbine wheel from the turbine rotor shaft.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
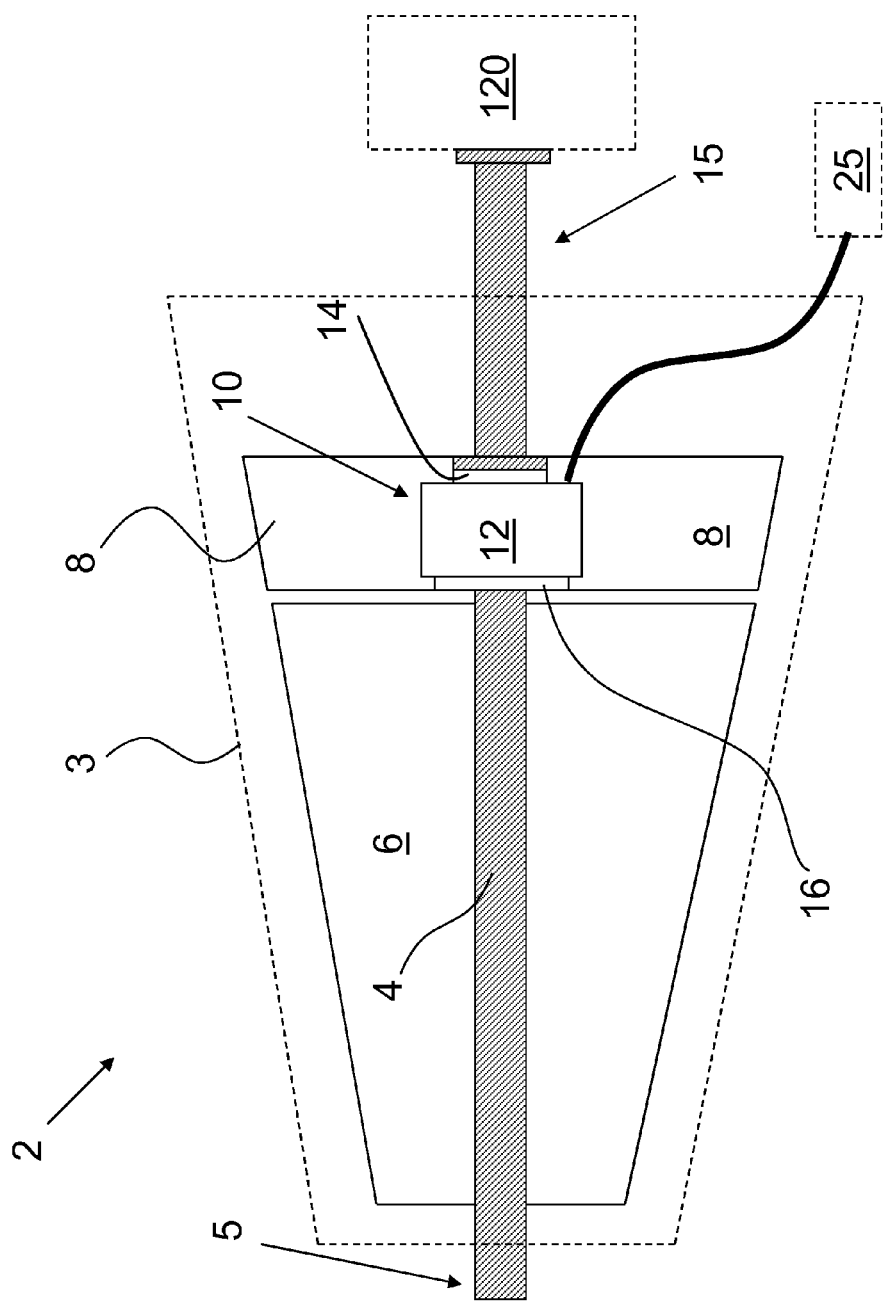
FIGS. 1-6 show schematic side views of an apparatus according to embodiments.

As indicated above, aspects of the invention provide for clutched turbine wheels. Specifically, aspects of the invention provide for coupling and decoupling an independent wheel from a turbine rotor shaft to improve turbine performance under certain operating conditions.

In the art of turbine power systems (including, e.g., steam turbines or gas turbines), the terms "rated power" and "rated mass flow" refer to the total power output and total mass flow, respectively, of one or more devices under certain predefined conditions. Typically, the rated power/mass flow of a turbine system is designed for a particular set of conditions, and these designed conditions are set as the 100 percent rated power/mass flow marks. When starting up a turbine system, or when operating at conditions other than design conditions (e.g., at "part load"), the power and mass flow of the turbine system drops below the 100 percent rated power/mass flow marks. This reduced mass flow of the working fluid through the turbine results in a pressure decrease inside the turbine, and reduces the pressure drop across wheels of the turbine. At lower pressure portions (larger aft stages) of the turbine, the pressure drop across a wheel may be so minimal that the mass flow does not produce a net positive force on the turbine shaft. For example, the pressure drop across a last stage bucket (LSB) may be so minimal that the turbine rotor stage must perform mechanical work to move the fluid through the stage (e.g., acting as a compressor). In these situations, lower pressure stages detract from the overall efficiency of the turbine system by causing large rotational and aerodynamic losses.

Turning to the figures, embodiments including an apparatus are shown, where the apparatus increases the efficiency of a turbine by using clutched turbine wheels to decouple one or more wheels from the turbine rotor shaft. Specifically, turning to FIG. 1, an apparatus 2 according to an embodiment is shown. Apparatus 2 may be a portion of a turbine machine, which may be, for example, a steam turbine. In another embodiment, apparatus 2 may be a portion of a gas turbine machine. In any case, apparatus 2 may include a turbine housing 3 containing a turbine rotor shaft 4 and a plurality of turbine wheels 6 affixed to turbine rotor shaft 4. Turbine rotor shaft 4 may have a fore portion 5 and an aft portion 15, where the fore portion 5 may be operably connected to other turbine stages (not shown) and aft portion 15 may be operably connected to, e.g., a load device 120 (shown in phantom). The plurality of turbine wheels 6 may be welded, forged or otherwise mechanically attached to turbine rotor shaft 4. Load device 120 may be any conventional electric generator, compressor, or pump, capable of converting the mechanical energy from rotation of turbine rotor shaft 4 into electrical or other mechanical energy. Load device 120 and its relationship to apparatus 2 is further described with reference to FIGS. 5-6.

Figure 3:
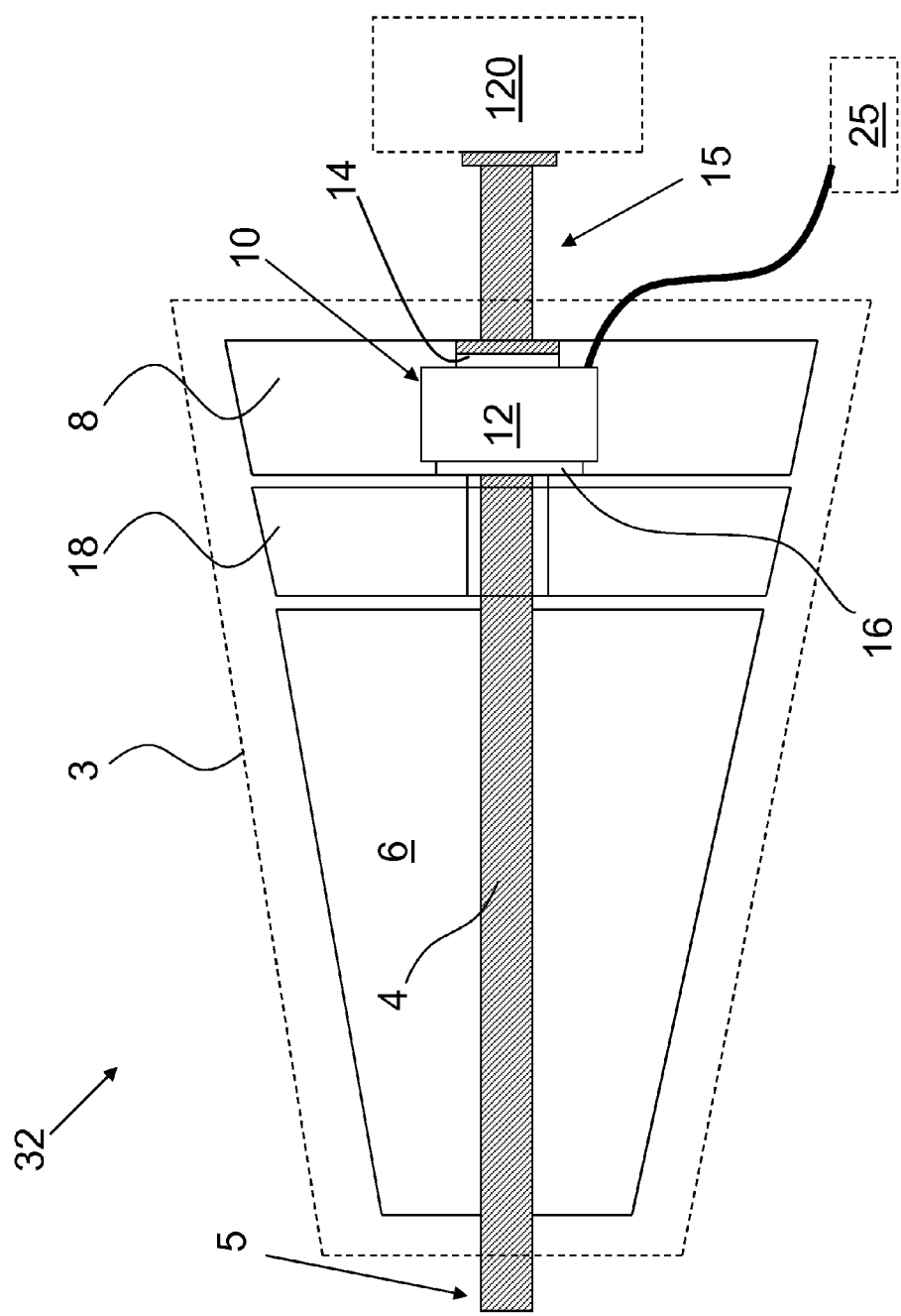

Apparatus 2 may further include an independent turbine wheel 8 engagably attached to the turbine rotor shaft 4, and a clutch 10 operably connected to the turbine rotor shaft 4. Clutch 10 is capable of coupling and decoupling independent turbine wheel 8 from the turbine rotor shaft 4. In the embodiment shown in FIG. 1 (and FIG. 3), clutch 10 may be housed within independent turbine wheel 8. However, in other embodiments (e.g., those shown and described with reference to FIGS. 3-5), clutch 10 may be mounted externally of independent turbine wheel 8. Where clutch 10 is housed within independent turbine wheel 8, axial space on turbine rotor shaft 4 (and within turbine housing 3) may be saved due to independent turbine wheel 8 substantially axially containing clutch 10.

Figure 2:
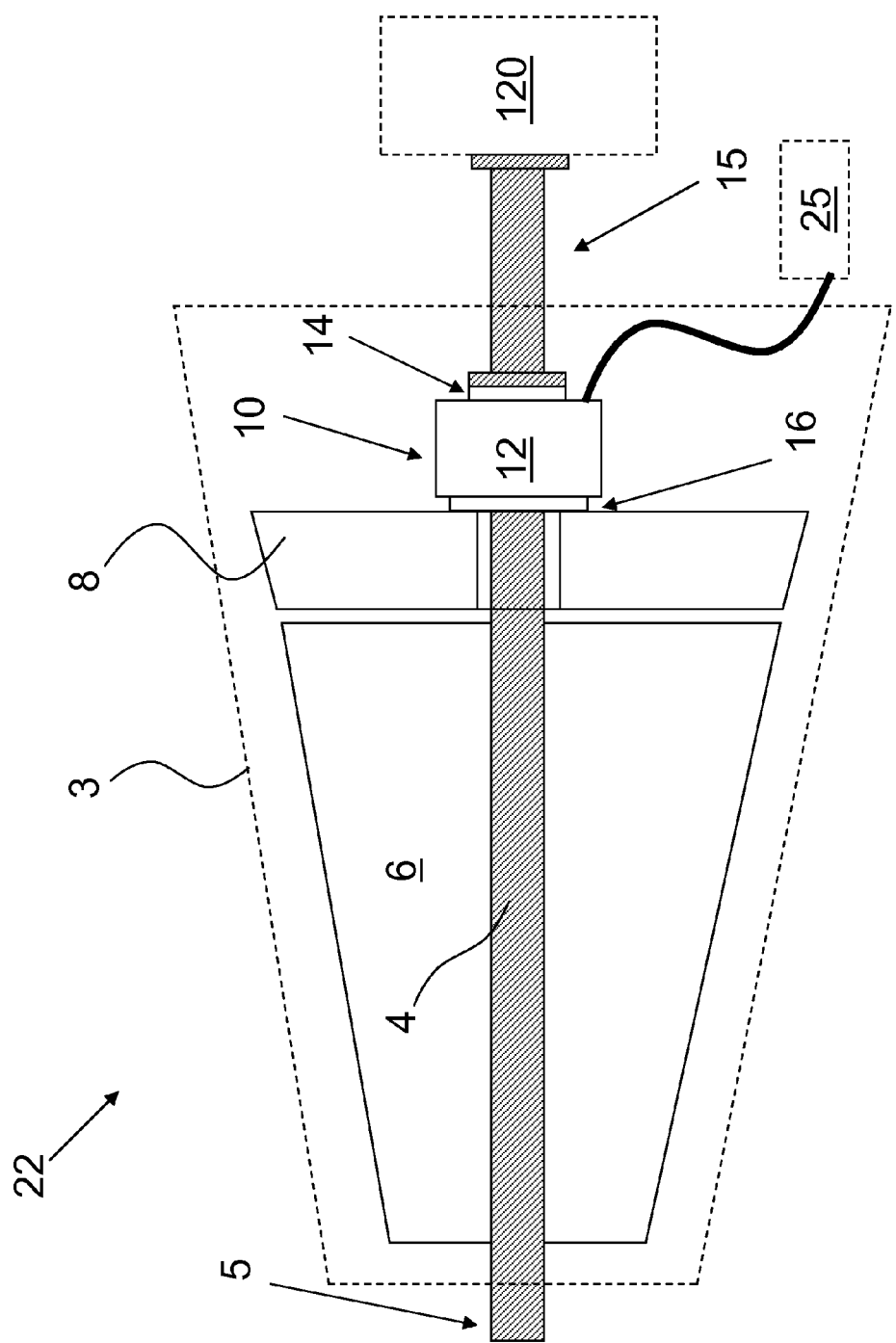

Turning to FIG. 2, clutch 10 is shown including a clutch member 12, an output flange 14 operably attached to turbine rotor shaft 4, and an input flange 16 operably attached to the independent turbine wheel 8. In this embodiment, input flange 16 is free from contact with turbine rotor shaft 4. Where input flange 16 is free from contact with turbine rotor shaft 4, turbine wheel 8 is free to move (or remain substantially stationary) independently of turbine rotor shaft 4 when wheel 8 is unable to contribute positive torque to shaft 4.

In one embodiment, clutch 10 may include an auto-synchronous clutch configured to couple output flange 14 to input flange 16 in response to independent turbine wheel 8 and turbine rotor shaft 4 attaining a substantially similar rotational speed (e.g., revolutions per minute (RPMs) or revolutions per second). That is, the auto-synchronous clutch ensures that independent turbine wheel 8 does not couple to turbine rotor shaft 4 until independent turbine wheel 8 reaches synchronous speed with turbine rotor shaft 4. For example, during startup, the mass flow rate of the working fluid (e.g., gas or steam) may be sufficient to force rotation of the plurality of turbine wheels 6 at higher pressure portions of apparatus 2. However, during this same startup phase the mass flow rate of the working fluid at the independent turbine wheel 8 may be insufficient to force rotation of independent turbine wheel 8 at the same rotational speed as the plurality of turbine wheels 6. As apparatus 2 reaches operational conditions (and mass flow rate increases), the flow of working fluid across the blades (not shown) of independent turbine wheel 8 may cause independent turbine wheel 8 to attain a substantially similar rotational speed as turbine rotor shaft 4. When this happens, clutch 10 may couple output flange 14 to input flange 16 to allow independent turbine wheel 8 to transfer the mechanical energy from its movement to turbine rotor shaft 4. Conversely, as the mass flow rate decreases (e.g., during reduction of the load), independent turbine wheel 8 may be decoupled from turbine rotor shaft 4 when independent turbine wheel 8 and turbine rotor shaft 4 attain different rotational speeds. In any case, clutch 10 ensures that independent turbine wheel 8 is only coupled to turbine rotor shaft 4 when independent turbine wheel 8 can provide positive mechanical energy to turbine rotor shaft 4.

In another embodiment, clutch 10 may be controlled by a controller 25 (shown in phantom). Controller 25 may be mechanically and/or electrically connected to clutch 10 such that controller 25 may actuate clutch 10. Controller 25 may instruct clutch 10 to couple/decouple independent turbine wheel 8 from turbine rotor shaft 4 in response to changes in the rotational speed of independent turbine wheel 8 and/or turbine rotor shaft 4. Controller 25 may be a computerized, mechanical, or electro-mechanical device capable of actuating clutch 10. In one embodiment, controller 25 may be a computerized device capable of providing operating instructions to clutch 10. In this case, controller 10 may monitor the rotational speeds of independent turbine wheel 8 and turbine rotor shaft 4, and provide operating instructions to clutch 10. For example, controller 25 may send operating instructions to couple/decouple independent turbine wheel 8 from turbine rotor shaft 4 when the rotational speed of turbine rotor shaft 4 approaches a certain predetermined level. In this embodiment, clutch 10 may include electro-mechanical components, capable of receiving operating instructions (electrical signals) from controller 25 and producing mechanical motion (e.g., uncoupling of flanges). In another embodiment, controller 25 may be a mechanical device, capable of use by an operator. In this case, the operator may physically manipulate controller 25 (e.g., by pulling a lever), which may actuate clutch 10. For example, the lever of controller 25 may be mechanically linked to clutch 10, such that pulling the lever causes clutch 10 to fully actuate. In another embodiment, controller 25 may be an electro-mechanical device, capable of electrically monitoring (e.g., with sensors) parameters indicating that turbine rotor shaft 4 is approaching a predetermined rotational speed, and mechanically actuating clutch 10. It is understood that controller may be a wireless or hard-wired device, and may be operated by a human operator via a user interface (e.g., a graphical user interface).

While FIGS. 1 and 2 show one independent turbine wheel 8, it is understood that a plurality of independent turbine wheels 8 may be coupled/decoupled to the turbine rotor shaft 4 by one or more clutches 10. For example, turning to FIG. 3, another embodiment is illustrated in which an apparatus 32 is shown including a second independent turbine wheel 18 engagably attached to turbine rotor shaft 4. Second independent turbine wheel 18 may be substantially similar to independent turbine wheel 8, and may be operably attached to clutch 10 via an input flange 16 (explained in greater detail below). In one embodiment, a single clutch 10 could be configured to couple and decouple independent turbine wheel 8 and second independent turbine wheel 18 with turbine rotor shaft 4. For example, in this embodiment, clutch 10 may be housed internally on independent turbine wheel 8, and may be mounted external to second independent turbine wheel 18. As shown, clutch 10 is housed internally on independent turbine wheel 8, which is located on the aft (15) side of second independent turbine wheel 18. However, it is understood that clutch 10 may be housed internally on second independent turbine wheel 18, and that independent turbine wheel 8 may still be mounted on the aft (15) side of second independent turbine wheel 18. It is also understood that that independent turbine wheel 8 and second independent turbine wheel 18 may be coupled/decoupled to turbine rotor shaft 4 by a plurality of clutches 10 (e.g., each independent turbine wheel has an internally housed clutch 10).

Figure 4:
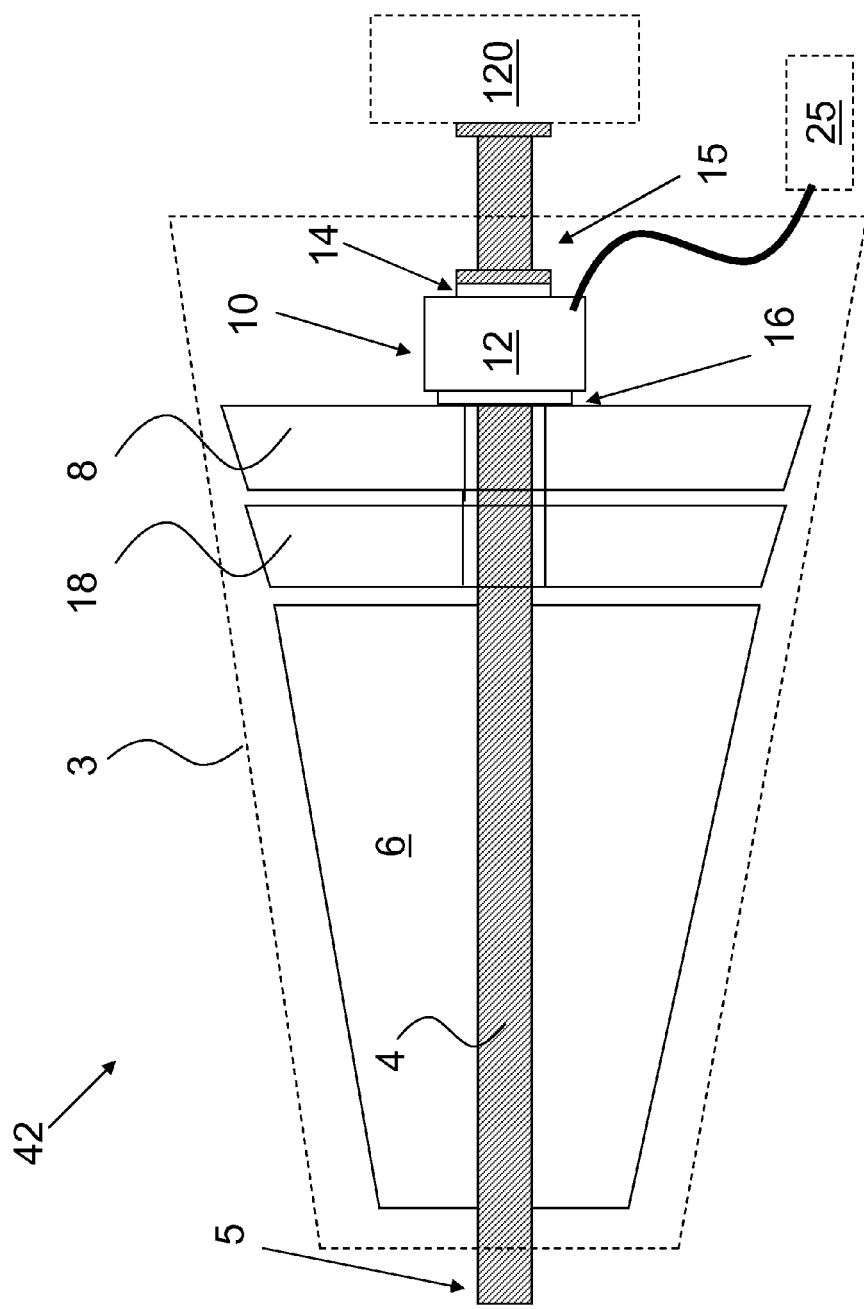

In one embodiment, as shown in FIGS. 2 and 4, the plurality of turbine wheels 6 and independent turbine wheel 8 are located on a same side of clutch 10. In this case, clutch 10 may be located closer to the aft portion 15 of turbine rotor shaft 4 than the plurality of turbine wheels 6 and independent turbine wheel 8. Where clutch 10 is located at the aft side of independent turbine wheel 8 and the plurality of turbine wheels 6, clutch 10 may be accessed more readily by, e.g., an operator and/or mechanic. This access may allow for, among other things, modification and/or repair of clutch 10. Further, location of clutch 10 as shown in FIGS. 1-4 may require, at most, minimal modification of the aerodynamic configuration of a turbine system including apparatus 2. That is, the mass flow pattern of the working fluid between the plurality of turbine wheels 6 and independent turbine wheel 8 may be substantially uninterrupted by clutch 10. Additionally, because independent turbine wheel 8 is located substantially proximately to the plurality of turbine wheels 6, the length of the turbine housing 3 holding apparatus 2 can remain substantially similar to a conventional turbine housing.

Figure 5:
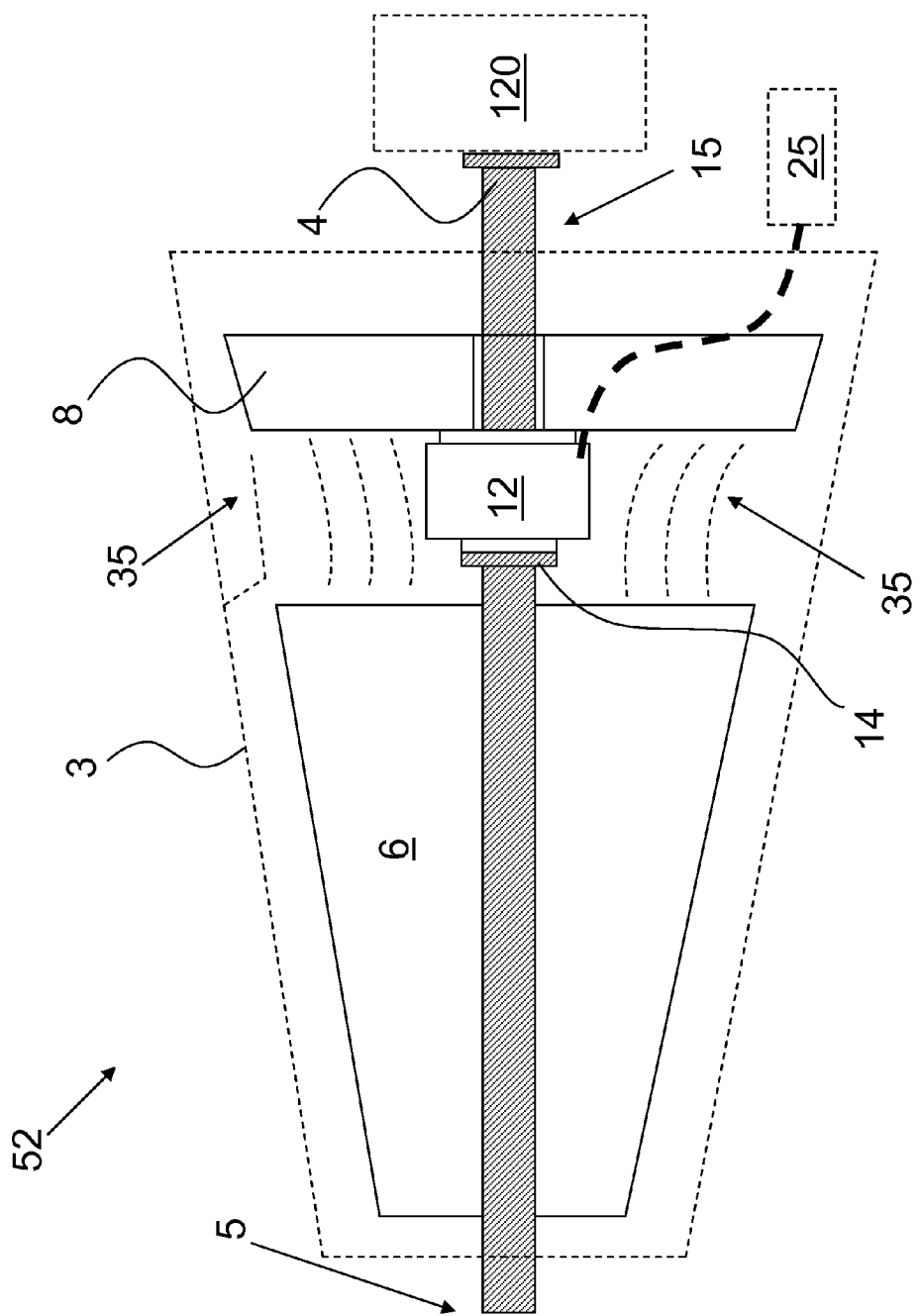

Turning to FIG. 5, an apparatus 52 is shown according to another embodiment. In this embodiment, clutch 10 is operably connected to the turbine rotor shaft 4 at a point between the plurality of turbine wheels 6 and independent turbine wheel 8. Clutch 10 and other components included in apparatus 52 may function substantially similarly to those shown and described with reference to FIG. 1. However, in this embodiment, unlike the embodiment shown in FIG. 1, the aerodynamic configuration of a turbine system including apparatus 52 may need to be modified from its traditional arrangement. That is, the mass flow pattern of working fluid leaving the plurality of turbine wheels 6 may need to be directed toward the independent turbine wheel 8 via, e.g., flow diverters 35 (shown in phantom). Flow diverters 35 may take the form of fins (as shown) or channels allowing the working fluid to effectively flow from the plurality of turbine wheels 6 to independent turbine wheel 8. In one embodiment, flow diverters 35 may be attached/cantilevered to walls of the turbine housing 3. In another embodiment, flow diverters 35 may be attached to a suspension ring or other internal fixture surrounding turbine rotor shaft 4. Further, this embodiment may require that the turbine housing 3 be lengthened in order to accommodate location of independent turbine wheel 8 at a point closer to aft portion 15.

Figure 6:
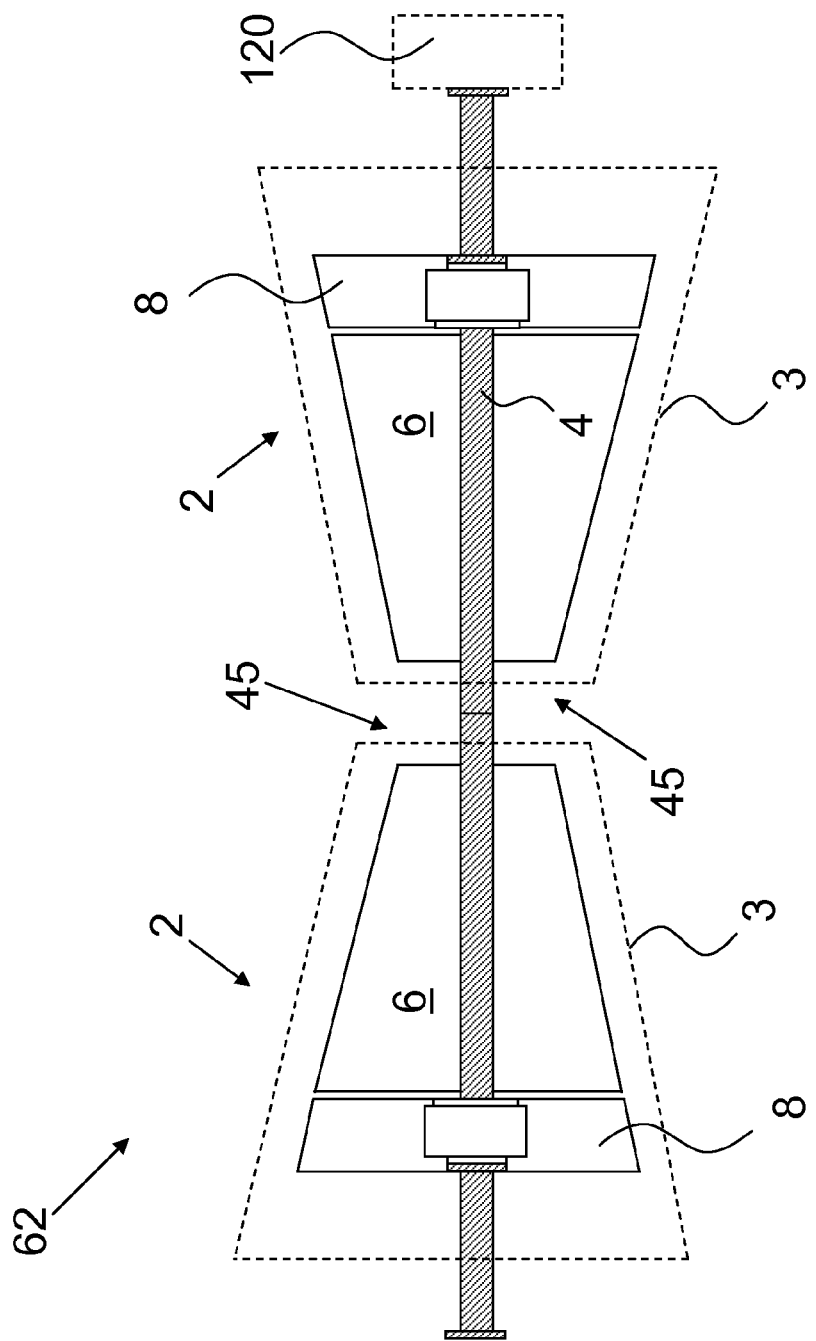

Turning to FIG. 6, a double-flow steam turbine apparatus 62 is shown including two portions of distinct steam turbine sections. Each distinct steam turbine section in apparatus 62 may include an apparatus 2 similar to apparatus 2 shown and described with reference to FIG. 1. As shown, each apparatus 2 may include a steam inlet 45 for receiving steam (not shown) from, e.g., a high-pressure or intermediate-pressure section of a turbine system. Each apparatus 2 may function substantially similarly to apparatus 2 shown and described with reference to FIG. 1. Both of apparatuses 2 may be mechanically coupled via a common turbine rotor shaft 4, which may be mechanically coupled to a load device 120 (as described with reference to FIG. 1). While apparatus 62 is shown and described including two apparatuses 2 shown in FIG. 1, it is further understood that apparatus 62 may include any combination of two apparatuses 2, 22, 32, 42 or 52 shown and described with reference to FIGS. 2-5.

It is understood that the embodiments shown and described herein may allow for improved performance of a turbine system including apparatus 2 and/or apparatus 22, 32, 42, 52. For example, as is known in the art, turbine housings are designed to include a radial clearance surrounding turbine wheels. This radial clearance may allow for expansion (known as "thermal growth") of the wheels and blades due to the high temperatures in the turbine. Where clutch 10 and independent turbine wheel 8 are employed, this thermal growth (correlated with higher temperatures) may be reduced via a reduction in rotational and aerodynamic losses during startup. For example, a turbine housing 3 experiencing reduced temperatures may be designed with reduced radial clearances. The resulting tighter clearances between rotating components (e.g., plurality of wheels 6, independent turbine wheel 8) and stationary seals (not shown) reduces leakage of the working fluid from turbine housing 3. This reduced leakage reduces performance losses across the entire operating range of the turbine system. In one embodiment, radial clearances can be reduced on the order of approximately 30-50% as compared to conventional rotors and turbine housings by employing apparatus 2 (or apparatus 22, 32, 42, 52). Given the decreased temperatures on the independent turbine wheels 8, 18, larger (longer) buckets located on independent turbine wheel 8, 18 may be used without the need to upgrade materials used for those buckets (e.g., due to higher allowable stresses, associated with lower temperatures on these buckets).

It is additionally understood that apparatus 2 (or apparatus 22, 32, 42, 52) employing one or more independent turbine wheels 8 may experience reduced erosion on the independent turbine wheel(s) 8. For example, during startup of a turbine system including apparatus 2 (or apparatus 22, 32, 42, 52), steam droplets flowing through the apparatus have a higher moisture content than during other times of operation. When those high-moisture steam droplets impact a moving turbine wheel (e.g., plurality of wheels 6), they erode portions of the moving turbine wheel. However, when those steam droplets impact a relatively stationary or slowly rotating turbine wheel (e.g., independent turbine wheel(s) 8), their erosive impact is significantly decreased. As such, independent turbine wheel(s) 8 will erode less quickly, and have longer life cycles, than turbine wheels which are fixed to the turbine shaft (and moving at higher speed) during startup of the turbine system.

Figure 7:
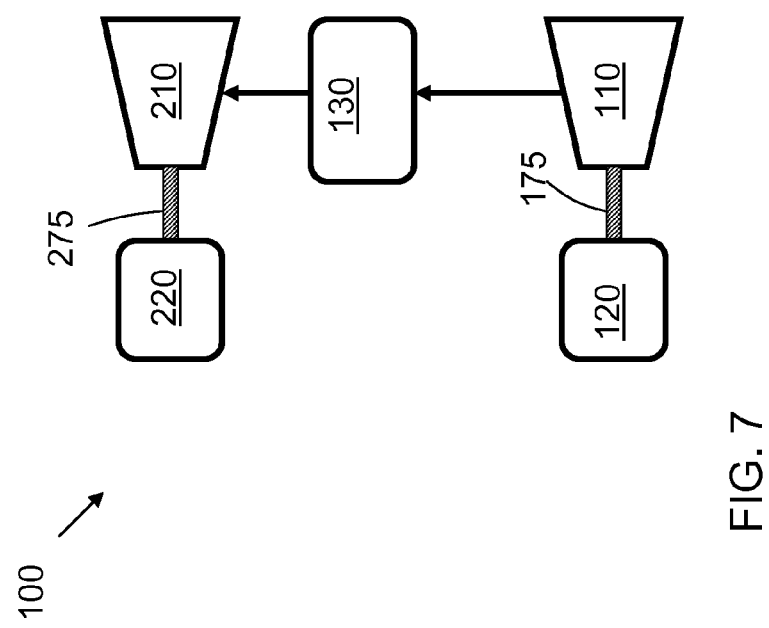
FIGS. 7-8 show schematic block diagrams illustrating portions of combined cycle power plant systems according to embodiments.
Figure 8:
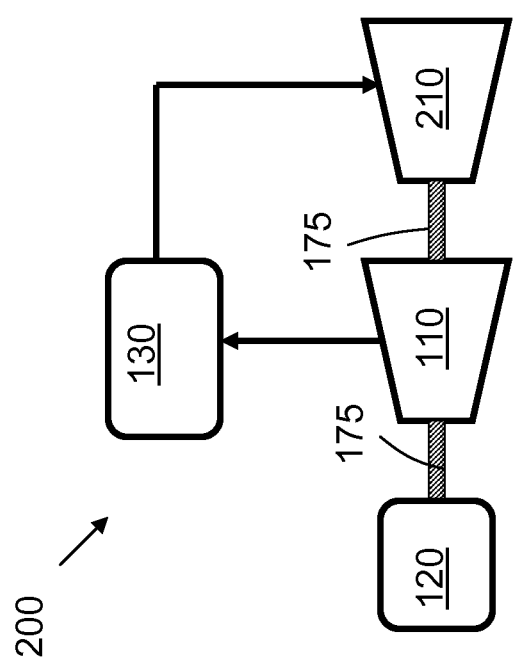

Turning to FIG. 7, a schematic view of portions of a multi-shaft combined cycle power plant 100 is shown. Combined cycle power plant 100 may include, for example, a gas turbine 110 operably connected to a first load device 120. Load device 120 may include, e.g., a conventional electric generator, a compressor, a pump or another conventional load device. Load device 120 and gas turbine 110 may be mechanically coupled by a shaft 175, which may transfer energy between a drive shaft (not shown) of gas turbine 110 and load device 120. Also shown in FIG. 7 is a heat exchanger 130 operably connected to gas turbine 110 and a steam turbine 210. Steam turbine 210 may include apparatus 2 (or apparatus 22, 32, 42, 52, or others described herein) which may include a clutch 10 and independent turbine wheel 8. Heat exchanger 130 may be fluidly connected to both gas turbine 110 and steam turbine 210 via conventional conduits (numbering omitted). Heat exchanger 130 may be a conventional heat recovery steam generator (HRSG), such as those used in conventional combined cycle power systems. As is known in the art of power generation, HRSG may use hot exhaust from gas turbine 110, combined with a water supply, to create steam which is fed to steam turbine 210. Steam turbine 210 may optionally be coupled to a second load device 220 (via a second shaft 275). Second load device 220 and second shaft 275 may operate substantially similarly to load device 120 and shaft 175 described above. In another embodiment, shown in FIG. 8, a single shaft combined cycle power plant 200 may include a single generator 120 coupled to both gas turbine and steam turbine via a single shaft 175.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
a turbine rotor shaft;
a plurality of turbine wheels affixed to the turbine rotor shaft;
an independent turbine wheel engagably attached to the turbine rotor shaft; and
a clutch operably connected to the turbine rotor shaft, the clutch configured to couple and decouple the independent turbine wheel from the turbine rotor shaft:
wherein the clutch is housed within the independent turbine wheel, and
wherein the clutch is at least partially axially centralized between a fore end and an aft end of the independent turbine wheel.

2. The apparatus of claim 1, wherein the clutch includes an auto-synchronous clutch.

3. The apparatus of claim 1, wherein the clutch includes:
a clutch member;
an output flange operably attached to the turbine rotor shaft; and
an input flange operably attached to the independent turbine wheel, the input flange being free from contact with the turbine rotor shaft.

4. The apparatus of claim 3, wherein the clutch member is configured to couple the input flange to the output flange in response to the independent turbine wheel and the turbine rotor shaft attaining a substantially similar rotational speed.

5. The apparatus of claim 1, wherein the independent turbine wheel substantially axially contains the clutch.

6. An apparatus comprising:
a load device; and
a turbine coupled to the load device, the turbine including:
a turbine rotor shaft;
a plurality of turbine wheels affixed to the turbine rotor shaft;
an independent turbine wheel engagably attached to the turbine rotor shaft; and
a clutch operably connected to the turbine rotor shaft, the clutch configured to couple and decouple the independent turbine wheel from the turbine rotor shaft,
wherein the clutch is housed within the independent turbine wheel, and
wherein the clutch is at least partially axially centralized between a fore end and an aft end of the independent turbine wheel.

7. The apparatus of claim 6, wherein the clutch includes an auto-synchronous clutch.

8. The apparatus of claim 6, wherein the clutch includes:
a clutch member;
an output flange operably attached to the turbine rotor shaft; and
an input flange operably attached to the independent turbine wheel, the input flange being free from contact with the turbine rotor shaft.

9. The apparatus of claim 8, wherein the clutch member is configured to couple the input flange to the output flange in response to the independent turbine wheel and the turbine rotor shaft attaining a substantially similar rotational speed.

10. The apparatus of claim 6, wherein the independent turbine wheel substantially axially contains the clutch.

11. A system comprising:
a gas turbine operably connected to a first load device;
a heat exchanger operably connected to the gas turbine; and
a steam turbine operably connected to the heat exchanger;
wherein at least one of the gas turbine or the steam turbine include:
a turbine rotor shaft;
a plurality of turbine wheels affixed to the turbine rotor shaft;
an independent turbine wheel engagably attached to the turbine rotor shaft; and
a clutch operably connected to the turbine rotor shaft, the clutch configured to couple and decouple the independent turbine wheel from the turbine rotor shaft,
wherein the clutch is housed within the independent turbine wheel, and
wherein the clutch is at least partially axially centralized between a fore end and an aft end of the independent turbine wheel.

12. The system of claim 11, wherein the clutch includes an auto-synchronous clutch.

13. The system of claim 11, wherein the clutch includes:
a clutch member;
an output flange operably attached to the turbine rotor shaft; and
an input flange operably attached to the independent turbine wheel, the input flange being free from contact with the turbine rotor shaft.

14. The system of claim 13, wherein the clutch member is configured to couple the input flange to the output flange in response to the independent turbine wheel and the turbine rotor shaft attaining a substantially similar rotational speed.

15. The system of claim 11, wherein the independent turbine wheel substantially axially contains the clutch.

* * * * *